US012650348B2

(12) United States Patent
Isobe

(10) Patent No.: US 12,650,348 B2
(45) Date of Patent: Jun. 9, 2026

(54) SEMICONDUCTOR DEVICE

(71) Applicant: FUJI ELECTRIC CO., LTD.,
Kawasaki (JP)

(72) Inventor: Daisuke Isobe, Matsumoto-city (JP)

(73) Assignee: FUJI ELECTRIC CO., LTD.,
Kawasaki (JP)

( * ) Notice: Subject to any disclaimer, the term of this
patent is extended or adjusted under 35
U.S.C. 154(b) by 39 days.

(21) Appl. No.: 18/425,677

(22) Filed: Jan. 29, 2024

(65) Prior Publication Data

US 2024/0302218 A1 Sep. 12, 2024

(30) Foreign Application Priority Data

Mar. 8, 2023 (JP) .................................. 2023-035851

(51) Int. Cl.
*G01K 7/01* (2006.01)
*G05F 1/46* (2006.01)
*G05F 3/26* (2006.01)

(52) U.S. Cl.
CPC .............. *G01K 7/01* (2013.01); *G05F 1/468*
(2013.01); *G05F 3/262* (2013.01)

(58) Field of Classification Search
None
See application file for complete search history.

(56) References Cited

U.S. PATENT DOCUMENTS

| | | | | |
|---|---|---|---|---|
| 5,751,142 A | * | 5/1998 | Dosho | G05F 3/247 |
| | | | | 323/901 |
| 5,961,215 A | * | 10/1999 | Lee | G01K 7/01 |
| | | | | 374/178 |
| 6,084,462 A | * | 7/2000 | Barker | H10D 89/60 |
| | | | | 327/512 |

(Continued)

FOREIGN PATENT DOCUMENTS

| | | |
|---|---|---|
| JP | 4981267 B2 | 7/2012 |
| JP | 2019-184351 A | 10/2019 |
| JP | 2021-124342 A | 8/2021 |

OTHER PUBLICATIONS

Kate Snow, Subtraction: More Than Just Taking Away, May 1, 2017,
Well-Trained Mind, https://welltrainedmind.com/a/subtraction-just-
taking-away/?srsltid=AfmBOoqaVtXw703_laqfd4MXC8IMQuK9Up-
BNEcDAjWWxmsk6t5yif5M, date accessed Oct. 2, 2025.*

*Primary Examiner* — Thomas J. Hiltunen
(74) *Attorney, Agent, or Firm* — Rabin & Berdo, P. C.

(57) ABSTRACT

A semiconductor device includes a constant current source,
a current mirror circuit, a temperature detection circuit, a
reference voltage generation circuit, and a comparison cir-
cuit. The current mirror circuit copies a current from the
constant current source to thereby generate a copied current.
The temperature detection circuit includes a temperature
detection diode and a temperature detection voltage genera-
tion circuit connected in series with the temperature detec-
tion diode, and outputs a temperature detection voltage
based on the copied current. The reference voltage genera- (Continued)

tion circuit generates a reference voltage based on the copied current. The comparison circuit outputs a temperature detection signal on the basis of a result of comparing the temperature detection voltage with the reference voltage. The temperature detection voltage generation circuit and the reference voltage generation circuit have the same characteristics.

2 Claims, 12 Drawing Sheets

(56) References Cited

U.S. PATENT DOCUMENTS

| | | | | |
|---|---|---|---|---|
| 6,266,221 B1 * | 7/2001 | Scilla | ..................... | H02H 5/044 |
| | | | | 361/103 |
| 6,462,527 B1 * | 10/2002 | Maneatis | .................. | H03L 7/18 |
| | | | | 323/315 |
| 6,789,939 B2 * | 9/2004 | Schrodinger | ............ | G01K 7/01 |
| | | | | 327/512 |
| 6,811,309 B1 * | 11/2004 | Ravishanker | ............. | G05F 3/30 |
| | | | | 327/512 |
| 6,882,213 B2 * | 4/2005 | Kim | ......................... | G01K 7/01 |
| | | | | 327/512 |
| 7,579,899 B2 * | 8/2009 | Senriuchi | ............... | G01D 3/036 |
| | | | | 327/512 |
| 7,936,204 B2 * | 5/2011 | Im | ............................. | G01K 7/01 |
| | | | | 374/170 |
| 8,432,214 B2 * | 4/2013 | Olmos | ..................... | G01K 7/01 |
| | | | | 327/512 |
| 8,487,660 B2 * | 7/2013 | Floyd | ...................... | G05F 3/242 |
| | | | | 327/512 |
| 10,446,116 B2 * | 10/2019 | Zhang | .................... | G01K 1/026 |
| 2006/0256494 A1 | 11/2006 | Mori | | |
| 2019/0310140 A1 | 10/2019 | Mori | | |

* cited by examiner

SEMICONDUCTOR DEVICE

CROSS-REFERENCE TO RELATED APPLICATION

This application is based upon and claims the benefit of priority of the prior Japanese Patent Application No. 2023-035851, filed on Mar. 8, 2023, the entire contents of which are incorporated herein by reference.

BACKGROUND OF THE INVENTION

1. Field of the Invention

The embodiment discussed herein relates to a semiconductor device.

2. Background of the Related Art

A semiconductor device that drives a power semiconductor element has a protection function to prevent the power semiconductor element from failing. For example, one of such protection functions is to detect the temperature of a power semiconductor element and limit the current that flows through the power semiconductor element.

As related art, for example, there has been proposed a technique for improving the accuracy of detection by comparing the voltage of a temperature detection diode with a threshold voltage, outputting a level signal corresponding to a temperature state, and correcting the forward current of the diode (see, for example, Japanese Laid-open Patent Publication No. 2019-184351). Further, there has been proposed a technique in which a comparator is provided to compare the forward voltages of diodes on a plurality of paths (see, for example, Japanese Laid-open Patent Publication No. 2021-124342). Still further, there has been proposed a technique in which a circuit operates with a current generated by a constant current source, and detects overheating on the basis of whether a voltage that depends on the temperature of a semiconductor substrate has fallen below a threshold voltage (see, for example, Japanese Patent No. 4981267).

SUMMARY OF THE INVENTION

According to one aspect, there is provided a semiconductor device, including: a constant current source; a current mirror circuit that copies a current from the constant current source to thereby generate a copied current; a temperature detection circuit, including: a temperature detection diode, and a temperature detection voltage generation circuit connected in series with the temperature detection diode, the temperature detection circuit being configured to output a temperature detection voltage based on the copied current; a reference voltage generation circuit that generates a reference voltage based on the copied current, the reference voltage generation circuit having same characteristics as the temperature detection voltage generation circuit; and a comparison circuit that compares the temperature detection voltage with the reference voltage, to thereby output a temperature detection signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
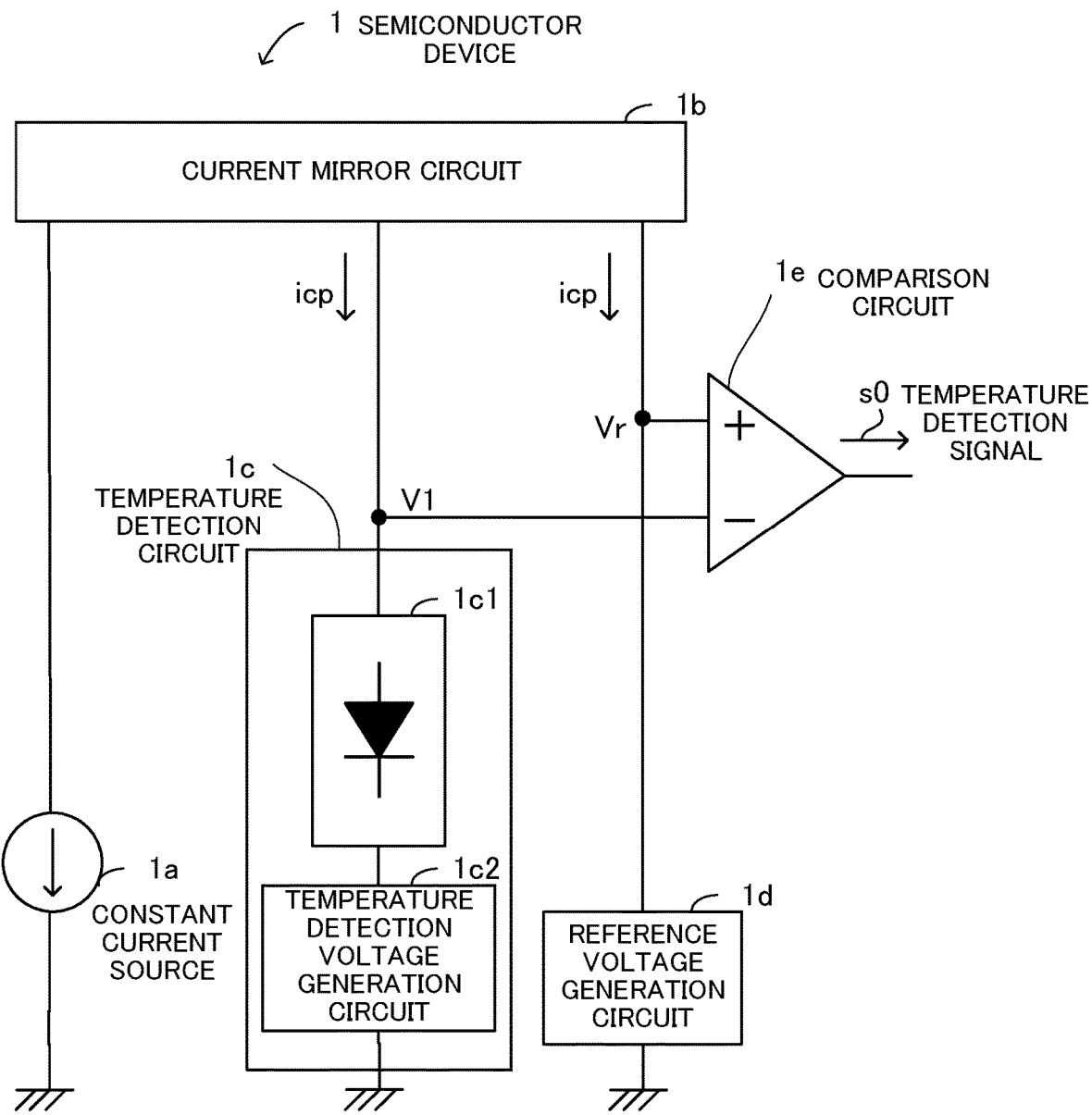
FIG. 1 is a view for describing an example of a semiconductor device.

Hereinafter, an embodiment will be described with reference to the accompanying drawings. FIG. 1 is a view for describing an example of a semiconductor device. The semiconductor device 1 includes a constant current source 1$a$, a current mirror circuit 1$b$, a temperature detection circuit 1$c$, a reference voltage generation circuit 1$d$, and a comparison circuit 1$e$. For example, the constant current source 1$a$ is formed by a depression-type metal oxide semiconductor (MOS) transistor.

The current mirror circuit 1$b$ copies a current from the constant current source 1$a$ to thereby generate a copied current icp. The temperature detection circuit 1$c$ includes a temperature detection diode 1$c$1 and a temperature detection voltage generation circuit 1$c$2 connected in series with the temperature detection diode 1$c$1, and is configured to output a temperature detection voltage V1 based on the copied current icp.

The reference voltage generation circuit 1$d$ generates a reference voltage Vr based on the copied current icp. The comparison circuit 1$e$ outputs a temperature detection signal so on the basis of a result of comparing the temperature detection voltage V1 with the reference voltage Vr. In this connection, the temperature detection voltage generation circuit 1$c$2 and the reference voltage generation circuit 1$d$ have the same characteristics.

In the semiconductor device 1 configured as described above, the temperature detection voltage generation circuit 1$c$2 connected to the temperature detection diode 1$c$1 and the reference voltage generation circuit $1d$ have the same characteristics, and therefore have the same tendency of characteristic shift (characteristic deviation).

When a characteristic shift occurs in the constant current source $1a$, the device as a whole exhibits the same tendency of characteristic shift because the device operates with the copied current generated by the current mirror circuit $1b$ copying the current from the constant current source $1a$. That is, when a characteristic shift occurs in a circuit element, the device as a whole tends to have a characteristic shift in the same direction. Therefore, this configuration makes it possible to reduce a characteristic shift and thus to improve the accuracy of temperature detection.

Figure 2:
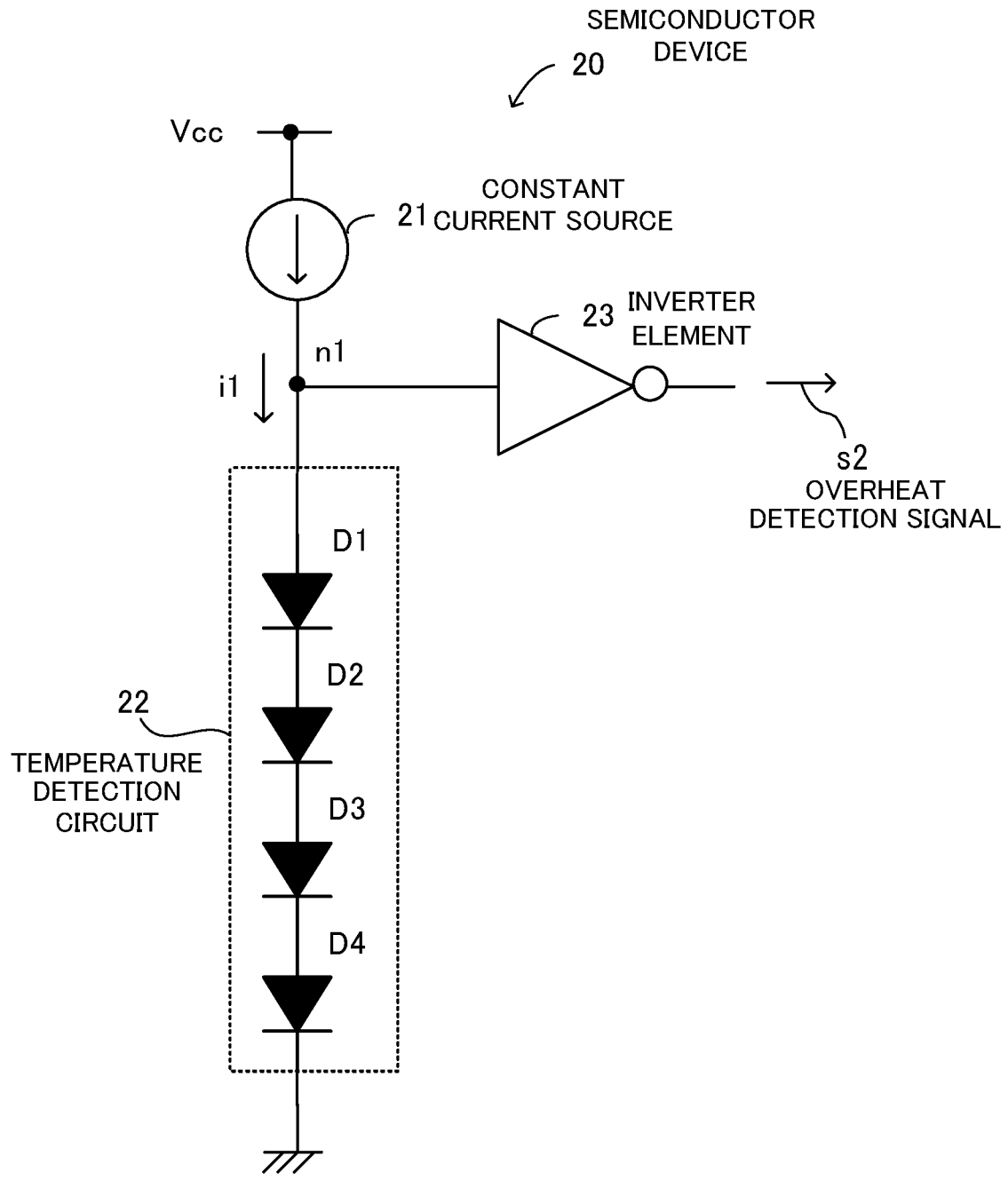
FIG. 2 illustrates an example of a configuration of a semiconductor device without a function of reducing a characteristic shift in a circuit element.

Before describing the details of the embodiment, a semiconductor device without a function of reducing a characteristic shift in a circuit element will be described with reference to FIGS. 2 to 5. FIG. 2 illustrates an example of a configuration of a semiconductor device without a function of reducing a characteristic shift in a circuit element. The semiconductor device 20 includes a constant current source 21, a temperature detection circuit 22, and an inverter element 23.

The temperature detection circuit 22 includes temperature detection diodes D1 to D4 in which a temperature detection voltage based on a current from the constant current source 21 varies. The inverter element 23 outputs an L-level overheat detection signal s2 when the temperature state of a circuit element that is a target of temperature detection by the temperature detection circuit 22 is a non-overheat state, and outputs an H-level overheat detection signal s2 when the temperature state of the circuit element is an overheat state.

With regard to the connectivity of the component elements, the input terminal of the constant current source 21 is connected to a power supply voltage Vcc. The output terminal of the constant current source 21 is connected to the anode of the temperature detection diode D1 and the input terminal of the inverter element 23.

The cathode of the temperature detection diode D1 is connected to the anode of the temperature detection diode D2, the cathode of the temperature detection diode D2 is connected to the anode of the temperature detection diode D3, and the cathode of the temperature detection diode D3 is connected to the anode of the temperature detection diode D4. The cathode of the temperature detection diode D4 is connected to a reference potential (hereinafter, referred to as GND).

Here, a current i1 that flows from the constant current source 21 toward the temperature detection diodes D1 to D4 becomes a forward current for the temperature detection diodes D1 to D4. Therefore, a voltage (temperature detection voltage) at the node n1 is the sum of the forward voltages (hereinafter, may be referred to as forward voltages VF) of the temperature detection diodes D1 to D4. Assuming, for example, that the temperature detection diodes D1 to D4 each have a forward voltage VF of 0.8 V, the temperature detection voltage at the node n1 is 3.2 (=0.8×4) V.

In addition, the temperature detection diodes D1 to D4 have temperature characteristics, and their forward voltages VF depend on temperature. For example, when the temperature increases by 1° C., the forward voltage VF of each temperature detection diode D1 to D4 drops by approximately 2 mV.

Therefore, for example, in the case where the temperature increases from 25° C. to 50° C., the forward voltage VF of each temperature detection diode D1 to D4 drops by 0.05 (=0.002×25) V.

Therefore, in the case where the forward voltage VF is 0.8 V at a temperature of 25° C. and the temperature increases to 50° C., the total drop of the forward voltages VF of the temperature detection diodes D1 to D4 is 0.2 (=0.05×4) V. Therefore, the temperature detection voltage at the node n1 is 3.0 (3.2−0.2) V.

As described above, the temperature detection voltage at the node n1 is 3.2 V at a temperature of 25° C. and is 3.0 V at a temperature of 50° C. That is, the temperature detection voltage at the node n1 varies with temperature, and more specifically drops as the temperature increases.

Figure 3:
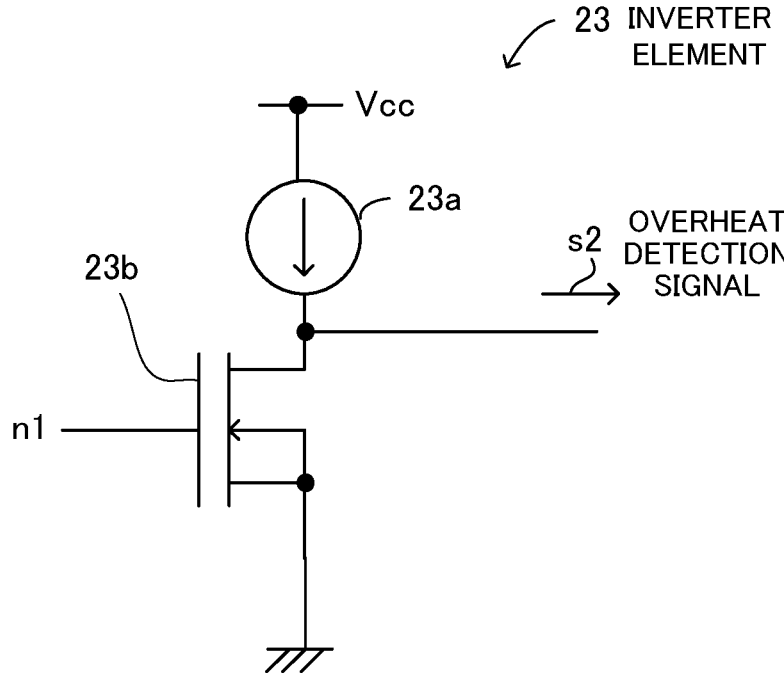
FIG. 3 illustrates an example of a circuit configuration of an inverter element.

FIG. 3 illustrates an example of a circuit configuration of an inverter element. The inverter element 23 includes a constant current source 23a and an NMOS (N-type MOS) transistor 23b. The input terminal of the constant current source 23a is connected to the power supply voltage Vcc. The output terminal of the constant current source 23a is connected to the drain of the NMOS transistor 23b.

The gate of the NMOS transistor 23b serves as the input terminal of the inverter element 23 and is connected to the node n1 illustrated in FIG. 2. The source of the NMOS transistor 23b is connected to GND. In addition, the connection point between the output terminal of the constant current source 23a and the drain of the NMOS transistor 23b serves as the output terminal of the inverter element 23, from which an overheat detection signal s2 is output.

Figure 4:
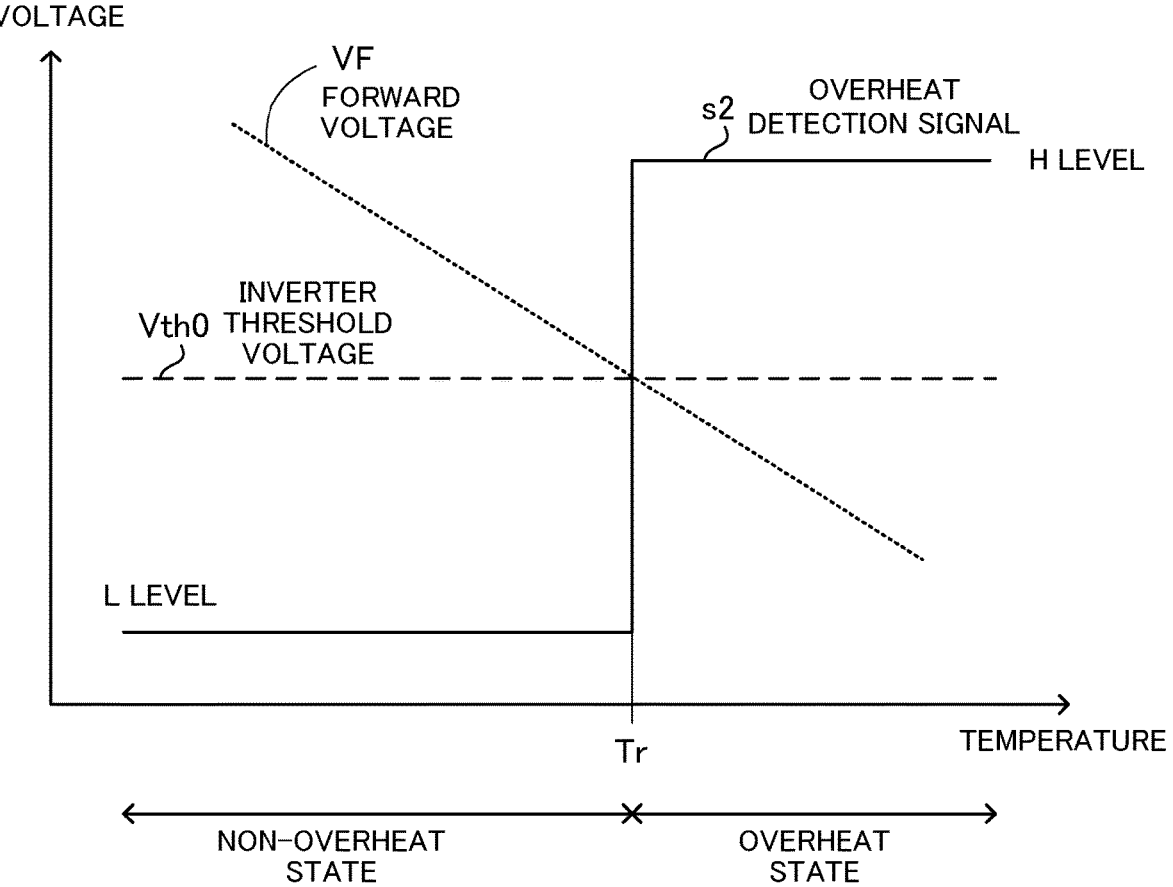
FIG. 4 illustrates an example of an output behavior of an overheat detection signal.

FIG. 4 illustrates an example of an output behavior of an overheat detection signal. The horizontal axis represents temperature, whereas the vertical axis represents voltage. A threshold temperature Tr is used to distinguish between a non-overheat state and an overheat state. The forward voltage VF (temperature detection voltage) at the node n1 drops as the temperature increases from low to high.

Therefore, a temperature state in which the forward voltage VF at the node n1 is higher than a threshold voltage (the threshold voltage of the NMOS transistor 23b) Vth0 of the inverter element 23 is determined to be a non-overheat state. In this case, the gate of the NMOS transistor 23b goes to an H level, which turns on the NMOS transistor 23b. As a result, an overheat detection signal s2 of L level representing the non-overheat state is output from the output terminal of the inverter element 23.

On the other hand, a temperature state in which the forward voltage VF is lower than the threshold voltage Vth0 of the inverter element 23 is determined to be an overheat state. In this case, the gate of the NMOS transistor 23b goes to an L level, which turns off the NMOS transistor 23b. As a result, overheat detection signal s2 of H level representing the overheat state is output from the output terminal of the inverter element 23.

Figure 5:
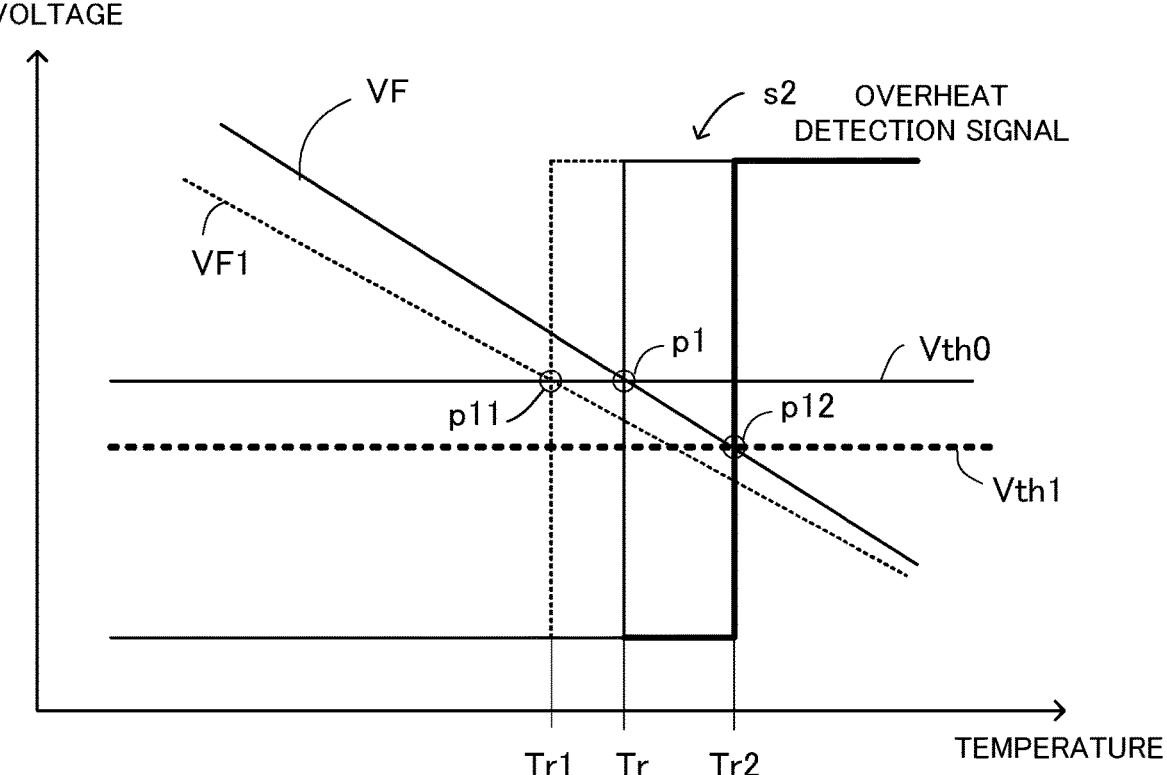
FIG. 5 illustrates examples of changes in an overheat detection signal due to characteristic deviations of circuit elements.

FIG. 5 illustrates examples of changes in an overheat detection signal due to characteristic deviations of circuit elements. The horizontal axis represents temperature, whereas the vertical axis represents voltage. A target condition is that an overheat detection signal s2 of H level representing an overheat state is output when a detected temperature becomes equal to or higher than a threshold temperature Tr.

In the above-described semiconductor device 20, there are deviation factors that are involved in characteristics, such as the current i1 that is output from the constant current source 21 and flows through the temperature detection diodes D1 to D4, the forward voltages VF of the temperature detection diodes D1 to D4, and a plurality of elements forming the inverter element 23. Among these deviation factors, in particular, the current i1 that is output from the constant current source 21 and the threshold voltage Vth0 of the NMOS transistor 23*b* in the inverter element 23 have significant impacts on the temperature detection.

For example, if the current i1 that is output from the constant current source 21 drops, the forward voltage VF at the node n1 drops to VF1. In this case, a detection point p1 shifts to p11, which accordingly changes the threshold temperature Tr to Tr1 in a lowering direction. As a result, although an overheat state is originally detected at the threshold temperature Tr or higher, the overheat state would be detected at the threshold temperature Tr1, which is lower than the threshold temperature Tr, or higher.

As another example, the threshold voltage Vth0 of the NMOS transistor 23*b* in the inverter element 23 drops to Vth1. In this case, the detection point p1 shifts to p12, which accordingly changes the threshold temperature Tr to Tr2 in a raising direction. As a result, although the overheat state is originally detected at the threshold temperature Tr or higher, the overheat state would be detected at the threshold temperature Tr2, which is higher than the threshold temperature Tr, or higher.

The above-described examples of characteristic deviations relate to a drop in the current i1 that is output from the constant current source 21 and a drop in the threshold voltage Vth0 of the NMOS transistor 23*b*. In the case of an increase in the current i1 that is output from the constant current source 21 and in the case of an increase in the threshold voltage Vth0 of the NMOS transistor 23*b*, the operations opposite to the ones described above are carried out.

The prevent embodiment has been made in view of the above circumstances and intends to provide a semiconductor device that enables stable detection at a predetermined threshold temperature by reducing a characteristic shift in a circuit element, in order to improve the accuracy of temperature detection.

Figure 6:
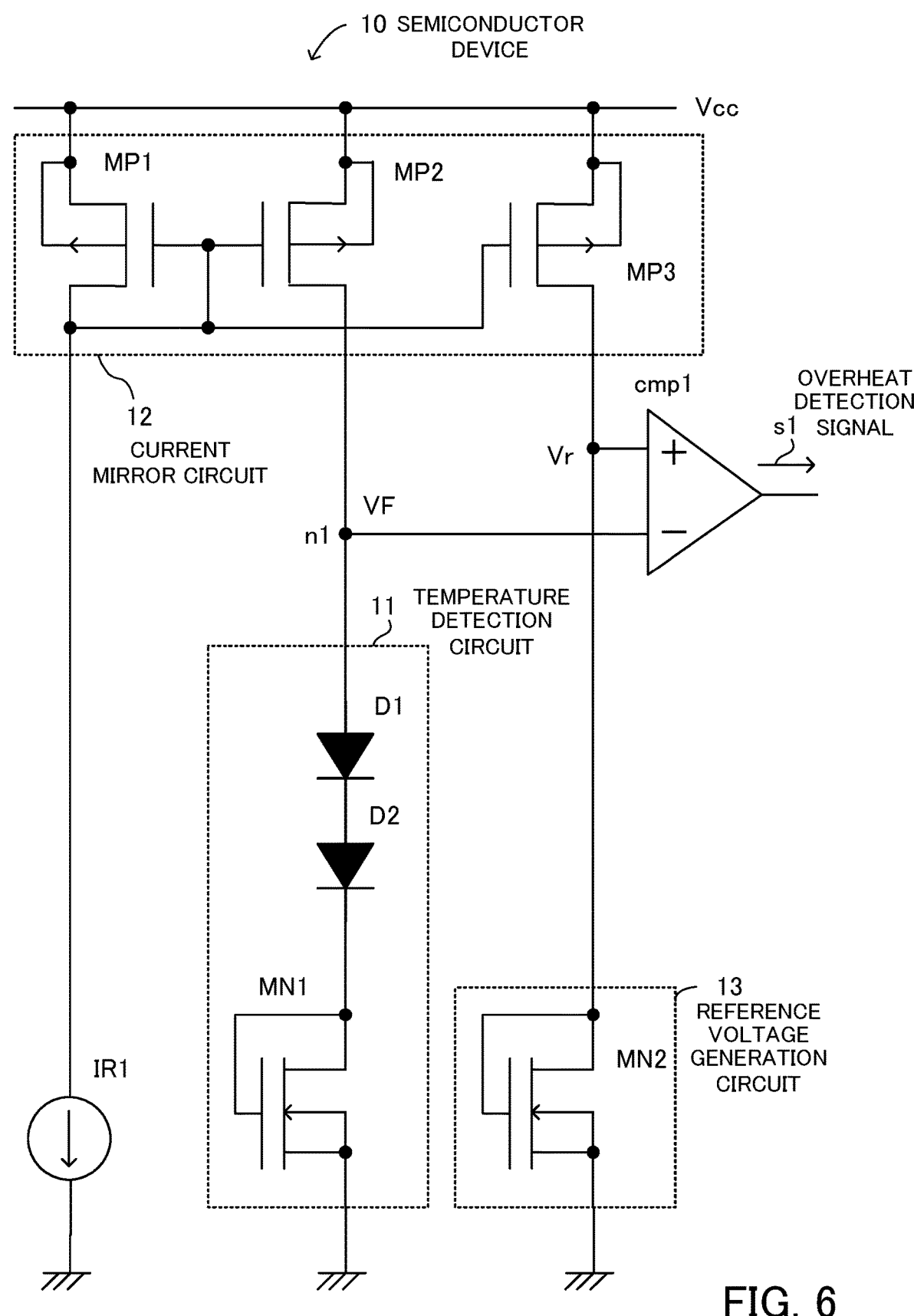
FIG. 6 illustrates an example of a configuration of a semiconductor device according to one embodiment.

The following describes the configuration and operation of a semiconductor device according to one embodiment in detail. FIG. 6 illustrates an example of a configuration of a semiconductor device according to the embodiment. The semiconductor device 10 has the functions of the semiconductor device 1 illustrated in FIG. 1, and includes a temperature detection circuit 11, a current mirror circuit 12, a reference voltage generation circuit 13, a constant current source IR1, and a comparator cmp1.

The temperature detection circuit 11 includes temperature detection diodes D1 and D2 and a diode-connected NMOS transistor MN1 (a first MOS transistor). The number of temperature detection diodes D1 and D2 connected in series is not limited to two, and any number of temperature detection diodes may be provided. In addition, the NMOS transistor MN1 corresponds to the temperature detection voltage generation circuit 1*c*2 illustrated in FIG. 1.

The current mirror circuit 12 includes PMOS (P-type MOS) transistors MP1, MP2, and MP3. The reference voltage generation circuit 13 includes a diode-connected NMOS transistor MN2 (a second MOS transistor). In this connection, the NMOS transistor MN1 and the NMOS transistor MN2 are identical in temperature characteristics and characteristics such as operating point.

With regard to the connectivity of the component elements, the source of the PMOS transistor MP1 is connected to the back gate of the PMOS transistor MP1, the source of the PMOS transistor MP2, the back gate of the PMOS transistor MP2, the source of the PMOS transistor MP3, the back gate of the PMOS transistor MP3, and a power supply voltage Vcc.

The gate of the PMOS transistor MP1 is connected to the drain of the PMOS transistor MP1, the input terminal of the constant current source IR1, the gate of the PMOS transistor MP2, and the gate of the PMOS transistor MP3. The output terminal of the constant current source IR1 is connected to GND.

The drain of the PMOS transistor MP2 (a first terminal of the current mirror circuit 12) is connected to the anode of the temperature detection diode D1 and the inverting input terminal (−) of the comparator cmp1.

The cathode of the temperature detection diode D1 is connected to the anode of the temperature detection diode D2. The cathode of the temperature detection diode D2 is connected to the drain of the NMOS transistor MN1 and the gate of the NMOS transistor MN1. The source of the NMOS transistor MN1 is connected to GND.

The drain of the PMOS transistor MP3 (a second terminal of the current mirror circuit 12) is connected to the non-inverting input terminal (+) of the comparator cmp1, the drain of the NMOS transistor MN2, and the gate of the NMOS transistor MN2. The source of the NMOS transistor MN2 is connected to GND.

As described above, the semiconductor device 10 includes the temperature detection circuit 11 in which the NMOS transistor MN1, which is a diode-connected MOS Field Effect Transistor (MOSFET), is connected in series with the temperature detection diodes D1 and D2. Further, the semiconductor device 10 includes the current mirror circuit 12 that copies an output current of the constant current source IR1 to thereby generate a copied current that is then fed to the temperature detection circuit 11.

Still further, the semiconductor device 10 includes a diode-connected MOSFET (the NMOS transistor MN2) that generates a reference voltage Vr with the copied current generated by the current mirror circuit 12. In this connection, the MOSFET in the temperature detection circuit 11 and the MOSFET that generates the reference voltage Vr are elements with the same characteristics. Still further, the semiconductor device 10 includes the comparator cmp1 that compares a forward voltage VF (temperature detection voltage) at the node n1 with the reference voltage Vr and outputs an overheat detection signal s1.

Figure 7:
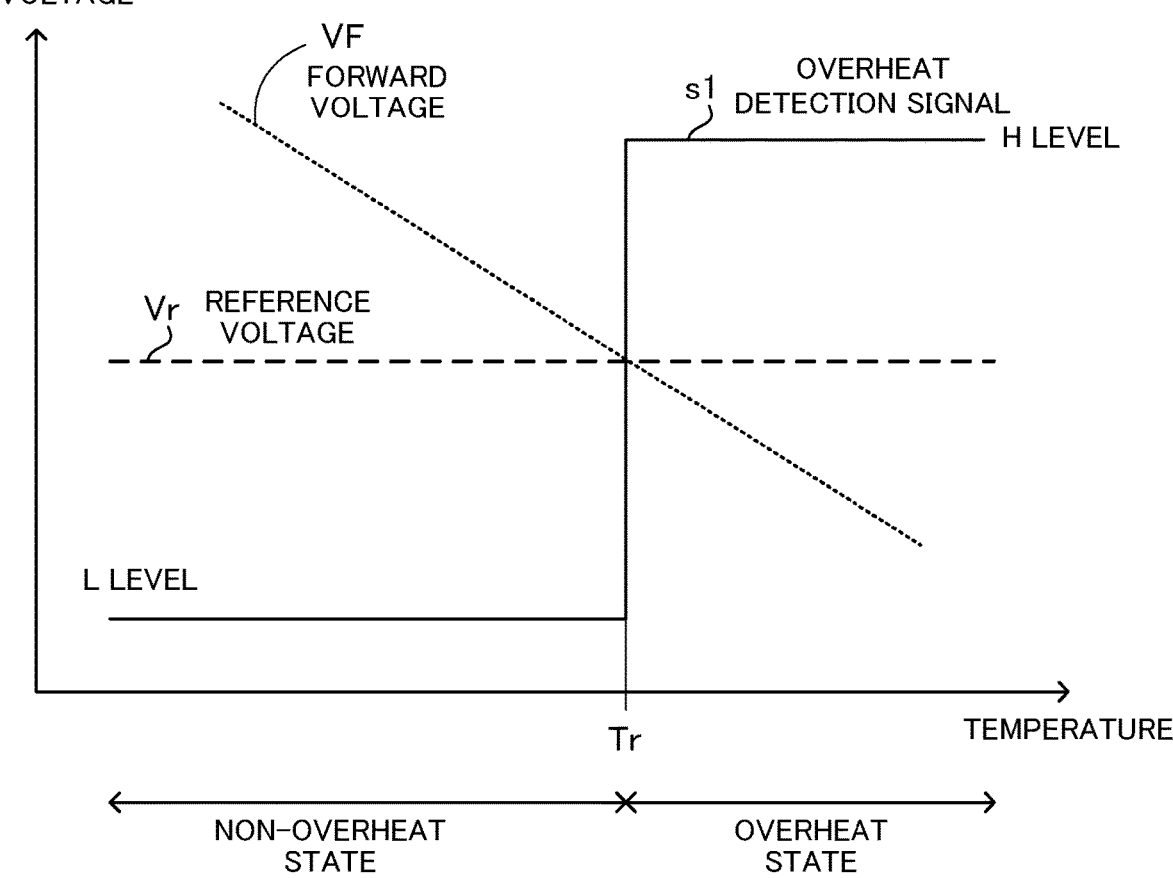
FIG. 7 illustrates an example of an output behavior of an overheat detection signal.

FIG. 7 illustrates an example of an output behavior of an overheat detection signal. The horizontal axis represents temperature, whereas the vertical axis represents voltage. The reference voltage Vr in FIG. 7 is a voltage generated by the reference voltage generation circuit 13 and corresponds to a drain voltage (drain-source voltage) of the NMOS transistor MN2.

Here, the forward voltage VF at the node n1 drops as the temperature increases from low to high. Therefore, a temperature state in which the forward voltage VF is higher than the reference voltage Vr input to the non-inverting input terminal (+) of the comparator cmp1 is determined to be a non-overheat state.

In this case, the input level at the inverting input terminal (−) of the comparator cmp1 is higher than the input level at the non-inverting input terminal (+) of comparator cmp1 to which the reference voltage Vr is input. Therefore, an overheat detection signal s1 of L level representing the non-overheat state is output from the output terminal of the comparator cmp1.

On the other hand, a temperature state in which the forward voltage VF is lower than the reference voltage Vr input to the non-inverting input terminal (+) of the comparator cmp1 is determined to be an overheat state. In this case, the input level at the non-inverting input terminal (+)

of the comparator cmp1 is higher than the input level at the inverting input terminal (−) of the comparator cmp1 to which the forward voltage VF at the node n1 is input. Therefore, an overheat detection signal s1 of H level representing the overheat state is output from the output terminal of the comparator cmp1.

Note that, in the overheat state where the temperature is equal to or higher than the threshold temperature Tr, the forward voltage VF needs to fall below the input voltage (reference voltage Vr) input to the non-inverting input terminal (+) of the comparator cmp1. Therefore, for example, the following adjustment may be performed: increasing the size of the NMOS transistor MN1 that is connected to the temperature detection diode D2 to reduce the resistance value; or increasing the current flowing through the path including only the NMOS transistor MN2 to increase the drain voltage of the NMOS transistor MN2.

Figure 8:
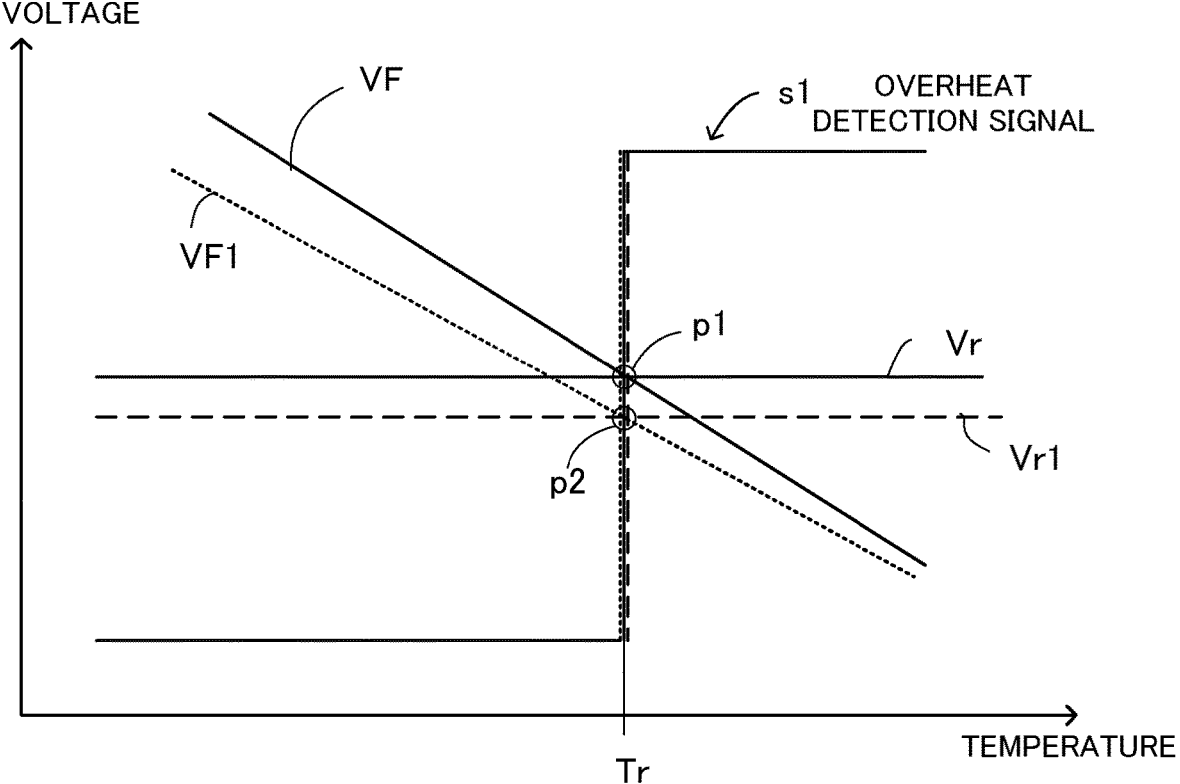
FIG. 8 illustrates an example of a change in an overheat detection signal due to a characteristic deviation of a circuit element.

FIG. 8 illustrates an example of a change in an overheat detection signal due to a characteristic deviation of a circuit element. The horizontal axis represents temperature, whereas the vertical axis represents voltage. A target condition is that an overheat detection signal s1 of H level representing an overheat state is output when a detected temperature becomes equal to or higher than a threshold temperature Tr.

In the semiconductor device 10, in the case where a current that is output from the constant current source IR1 drops as the phenomenon of a deviation factor, for example, the copied current generated by the current mirror circuit 12 also drops accordingly. The current that has dropped flows into the temperature detection circuit 11 and the reference voltage generation circuit 13. That is, the current drop leads to decreasing the forward voltage VF to VF1 and also decreasing the reference voltage Vr to Vr1.

As described above, when the output current from the constant current source IR1 drops, both the forward voltage VF and the reference voltage Vr drop. As a result, the deviation of the output current from the current reference source IR1 is offset, which reduces a shift in the threshold temperature Tr. In other words, a detection point p1 shifts to p2, which causes just a small change in the threshold temperature Tr.

Note that, if a deviation that is an increase in the output current from the constant current source IR1 occurs, the operation opposite to the above-described one where both the forward voltage VF and the reference voltage Vr increase is carried out, and the deviation of the output current from the current reference source IR1 is offset, which reduces a shift in the threshold temperature Tr.

In the manner described above, in the semiconductor device 10, the current from the constant current source IR1 is copied by the current mirror circuit 12, and the copied current is input to the temperature detection circuit 11 and the reference voltage generation circuit 13.

Then, based on the copied current, the temperature detection voltage (forward voltage VF at the node n1) and the reference voltage Vr are generated. The temperature detection voltage and the reference voltage are then compared by the comparator cmp1, which then outputs the overheat detection signal s1 on the basis of the comparison result. In this connection, the diode-connected NMOS transistor MN1 is provided in the temperature detection circuit 11, and the NMOS transistor MN1 and the NMOS transistor MN2 for the reference voltage generation are formed by elements with the same characteristics.

The above configuration enables stable detection at a predetermined threshold temperature, i.e., improves the accuracy of temperature detection by reducing a characteristic shift in a circuit element. In addition, this configuration eliminates the need of an additional circuit (such as a trimming circuit) of correcting deviations, which is an advantage of preventing an increase in device size.

Figure 9:
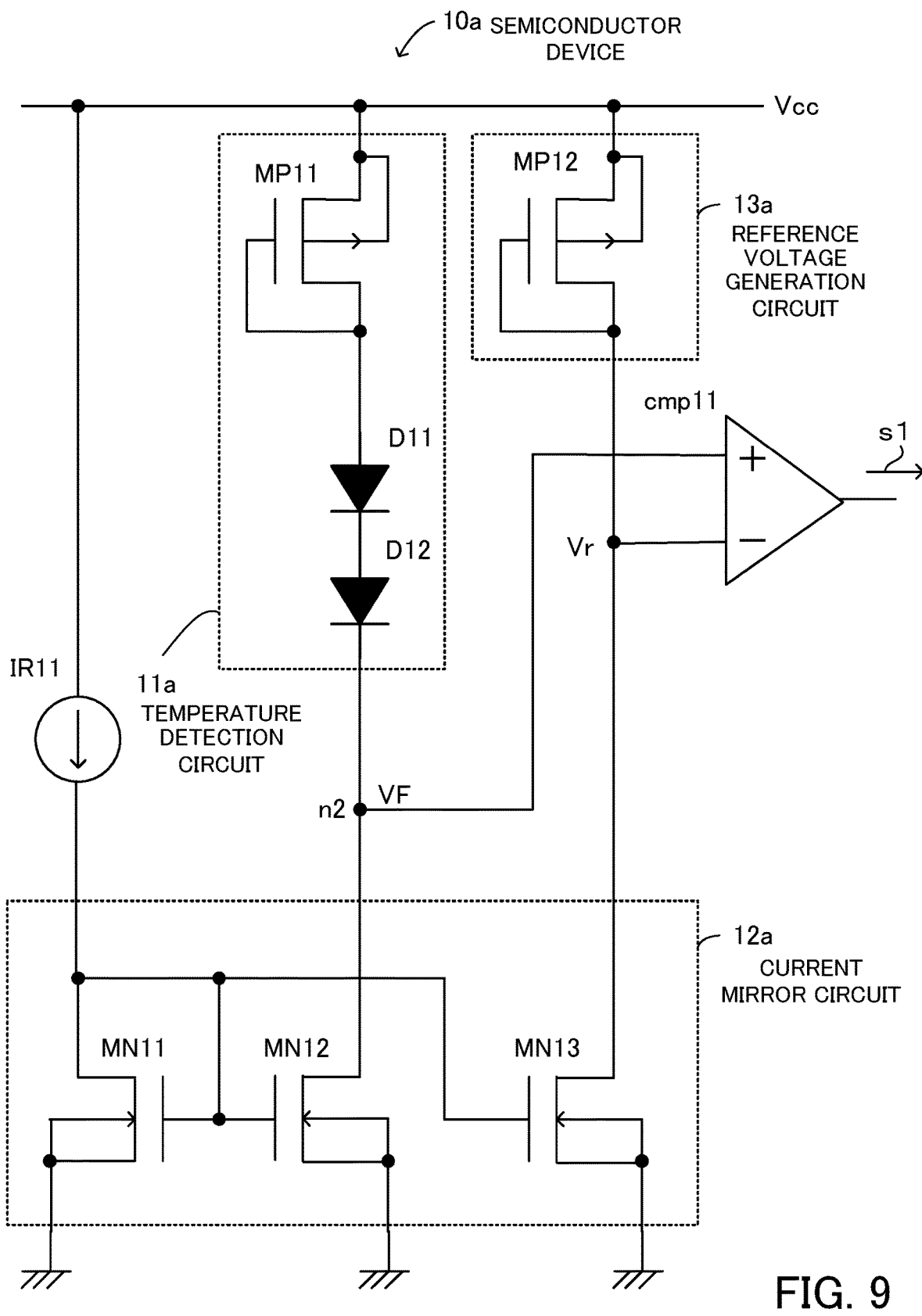
FIG. 9 illustrates a modification of the configuration of the semiconductor device.

FIG. 9 illustrates a modification of the configuration of the semiconductor device. The semiconductor device 10a of this modification includes a temperature detection circuit 11a, a current mirror circuit 12a, a reference voltage generation circuit 13a, a constant current source IR11, and a comparator cmp11.

The temperature detection circuit 11a includes temperature detection diodes D11 and D12 and a diode-connected PMOS transistor MP11 (a first MOS transistor). The number of temperature detection diodes D11 and D12 connected in series is not limited to two, and any number of temperature detection diodes may be provided. In addition, the PMOS transistor MP11 corresponds to the temperature detection voltage generation circuit 1c2 illustrated in FIG. 1.

The current mirror circuit 12a includes NMOS transistors MN11, MN12, and MN13. The reference voltage generation circuit 13a includes a diode-connected PMOS transistor MP12 (a second MOS transistor). In this connection, the PMOS transistor MP11 and the PMOS transistor MP12 are formed by elements that are identical in temperature characteristics and characteristics such as operating point.

With regard to the connectivity of the component elements, the source of the PMOS transistor MP11 is connected to the back gate of the PMOS transistor MP11, the source of the PMOS transistor MP12, the back gate of the PMOS transistor MP12, the input terminal of the constant current source IR11, and a power supply voltage Vcc.

The output terminal of the constant current source IR11 is connected to the drain of the NMOS transistor MN11, the gate of the NMOS transistor MN11, the gate of the NMOS transistor MN12, and the gate of the NMOS transistor MN13.

The gate of the PMOS transistor MP11 is connected to the drain of the PMOS transistor MP11 and the anode of the temperature detection diode D11. The cathode of the temperature detection diode D11 is connected to the anode of the temperature detection diode D12. The cathode of the temperature detection diode D12 is connected to the non-inverting input terminal (+) of the comparator cmp11 and the drain of the NMOS transistor MN12 (a first terminal of the current mirror circuit 12a).

The gate of the PMOS transistor MP12 is connected to the drain of the PMOS transistor MP12, the inverting input terminal (−) of the comparator cmp11, and the drain of the NMOS transistor MN13 (a second terminal of the current mirror circuit 12a). The sources of the NMOS transistors MN11, MN12, and MN13 are connected to GND.

As described above, the semiconductor device 10a includes the temperature detection circuit 11a in which a diode-connected MOSFET (the PMOS transistor MP11) is connected in series with the temperature detection diodes D11 and D12. Further, the semiconductor device 10a includes the current mirror circuit 12a that copies an output current of the constant current source IR11 to thereby generate a copied current that is then fed to the temperature detection circuit 11a.

Still further, the semiconductor device 10a includes a diode-connected MOSFET (the PMOS transistor MP12) that generates the reference voltage Vr based on the copied current generated by the current mirror circuit 12a. The MOSFET in the temperature detection circuit 11a and the MOSFET used to generate the reference voltage Vr are elements with the same characteristics. Still further, the semiconductor device 10a includes the comparator cmp11 that compares the forward voltage VF (temperature detection voltage) at a node n2 with the reference voltage Vr and outputs an overheat detection signal s1.

Figure 10:
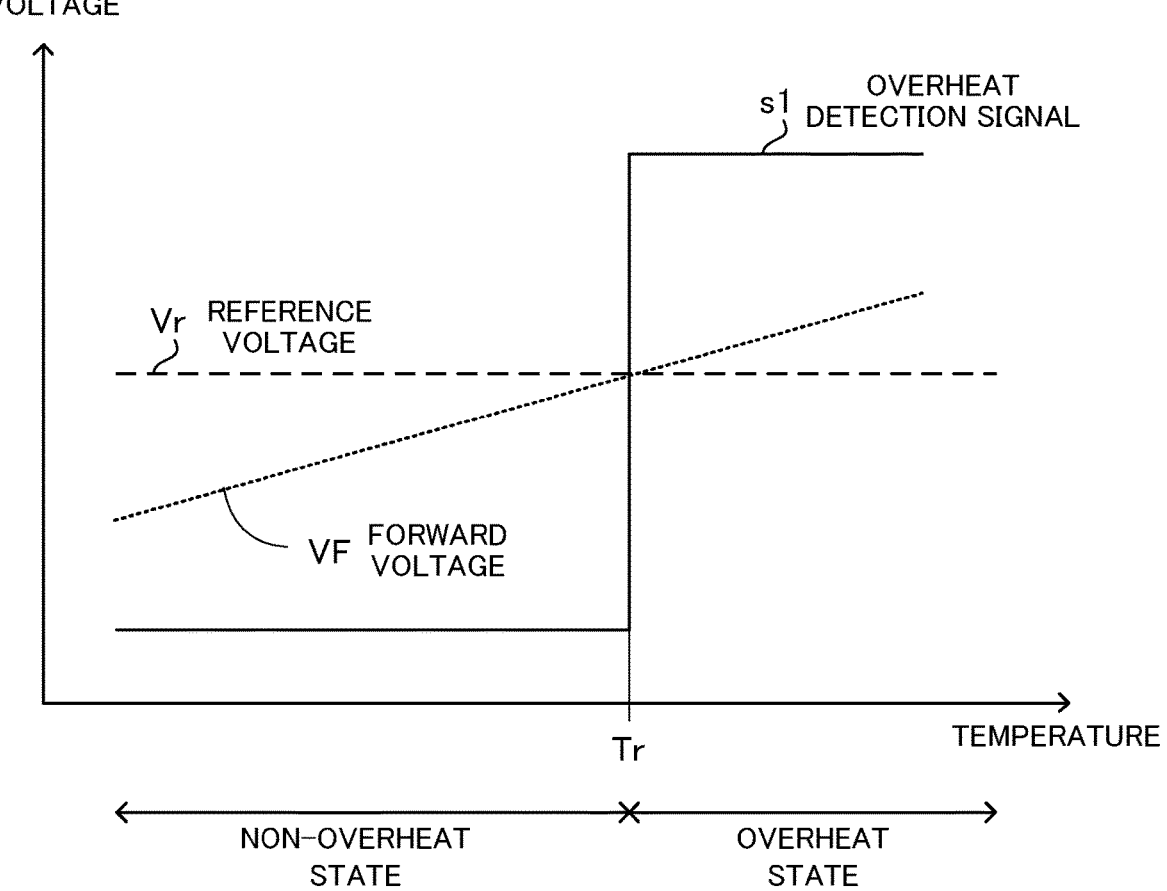
FIG. 10 illustrates an example of an output behavior of an overheat detection signal.

FIG. 10 illustrates an example of an output behavior of an overheat detection signal. The horizontal axis represents temperature, whereas the vertical axis represents voltage. The reference voltage Vr in FIG. 10 is a voltage generated by the reference voltage generation circuit 13a and corresponds to the drain voltage of the PMOS transistor MP12.

In this case, the forward voltage VF at the node n2 increases as the temperature increases from low to high. Therefore, a temperature state in which the forward voltage VF is lower than the reference voltage Vr input to the inverting input terminal (−) of the comparator cmp11 is determined to be a non-overheat state.

In this case, the input level at the non-inverting input terminal (+) of the comparator cmp11 is lower than the input level at the inverting input terminal (−) of the comparator cmp11 to which the reference voltage Vr is input. Therefore, an overheat detection signal s1 of L level representing the non-overheat state is output from the output terminal of the comparator cmp11.

On the other hand, a temperature state in which the forward voltage VF at the node n2 is higher than the reference voltage Vr input to the inverting input terminal (−) of the comparator cmp11 is determined to be an overheat state.

In this case, the input level at the inverting input terminal (−) of the comparator cmp11 is lower than the input level at the non-inverting input terminal (+) of the comparator cmp11 to which the forward voltage VF at the node n2 is input. Therefore, an overheat detection signal s1 of H level representing the overheat state is output from the output terminal of the comparator cmp11.

In the overheat state, the forward voltage VF at the node n2 needs to exceed the input voltage (reference voltage Vr) at the inverting input terminal (−) of the comparator cmp11. Therefore, for example, the following adjustment may be performed: increasing the size of the PMOS transistor MP11 connected to the temperature detection diode D11 to reduce the resistance value; or increasing the current flowing through the path including only the PMOS transistor MP12 to decrease the drain voltage of the PMOS transistor MP12.

Figure 11:
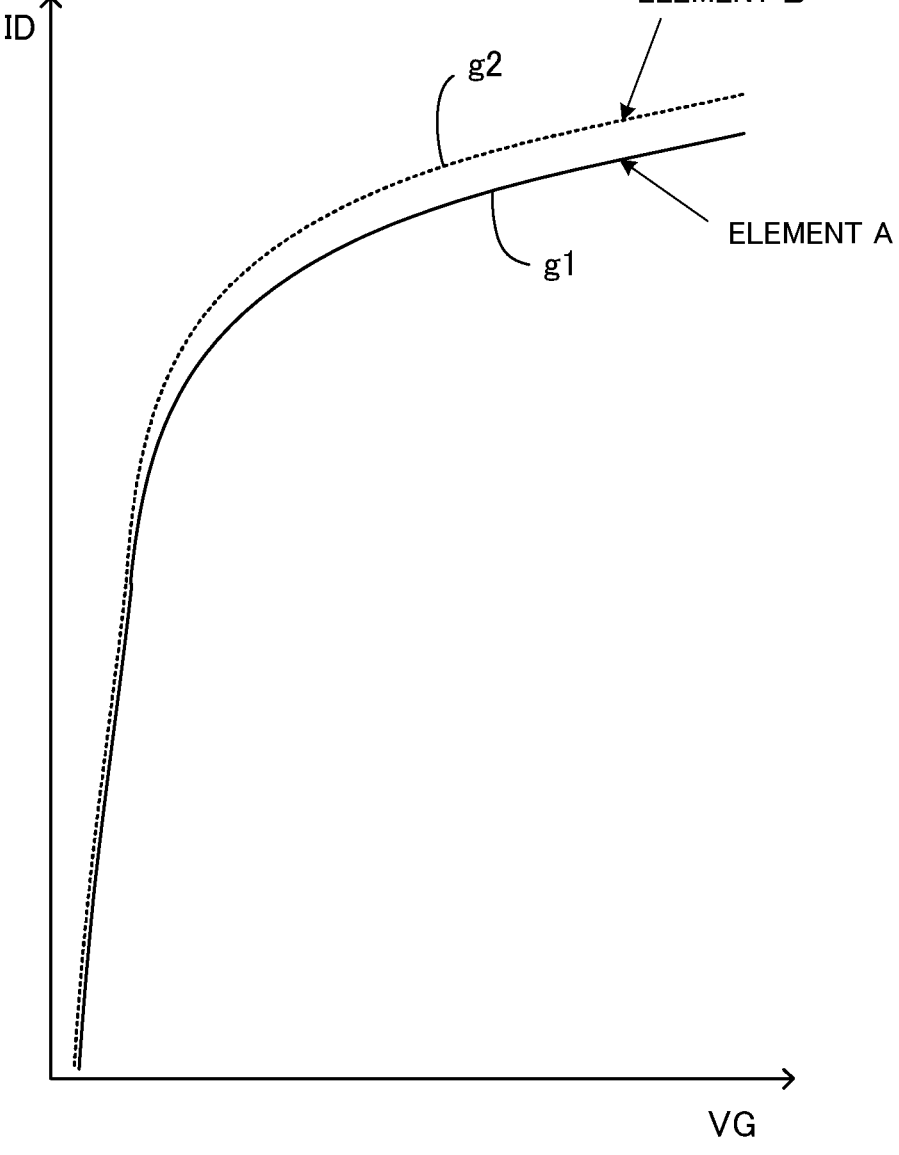
FIG. 11 illustrates an example of the characteristics of gate voltage and drain current of metal oxide semiconductor (MOS) transistors.
Figure 12:
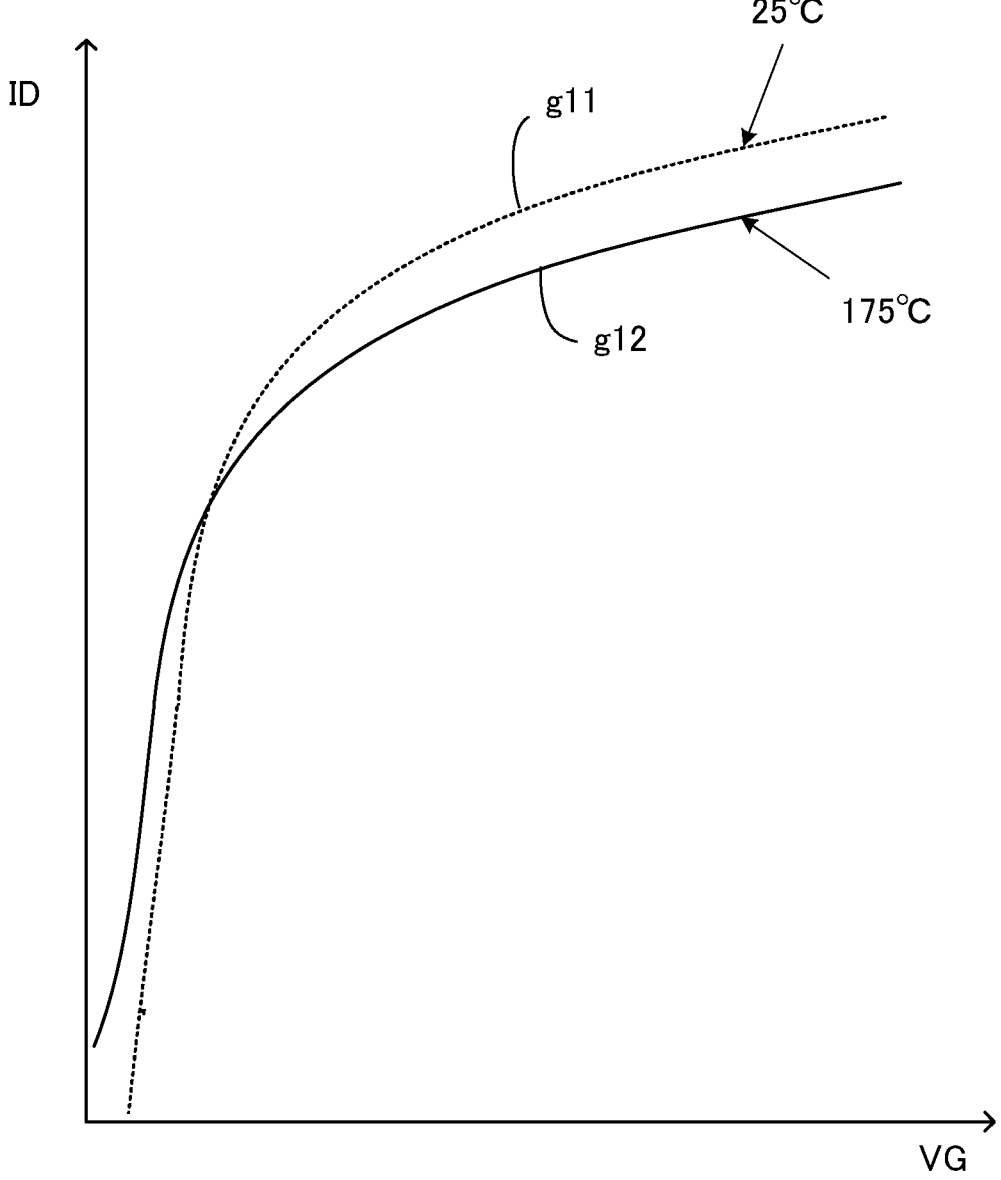
FIG. 12 illustrates an example of the characteristics of gate voltage and drain current of the MOS transistors.

The following describes the same characteristics with reference to FIGS. 11 and 12. FIG. 11 illustrates an example of the characteristics of gate voltage and drain current of MOS transistors. The horizontal axis represents gate voltage VG, whereas the vertical axis represents drain current ID. In this connection, the vertical axis is in logarithmic scale. In the case where an element A and an element B have the same characteristics, the element A and the element B have the same operating point. Assuming that the element A is the temperature detection voltage generation circuit 1c2 and the element B is the reference voltage generation circuit 1d, these temperature detection voltage generation circuit 1c2 and reference voltage generation circuit 1d have the same operating point as the same characteristics.

More specifically, assuming that the element A is the first MOS transistor and the element B is the second MOS transistor, the first and second MOS transistors have the same threshold voltage (gate voltage VG), which is an operating point, as the same characteristics.

Assume now that in the waveform g1 of the element A and the waveform g2 of the element B in FIG. 11, the element A and the element B have the characteristics of approximately multiples due to element constants (gate length, gate width, and others). In this case, for example, the element A needs a gate voltage VG of 0.8 V to cause a drain current ID of 1 μA (0.8 V @ 1 μA) to flow, and the element B needs a gate voltage VG of 0.8 V to cause a drain current ID of 2 μA (0.8 V @ 2 μA) to flow.

In the case where, with the same gate voltage VG, the characteristics are scaled by a factor (in this example, the drain current ID is doubled with the same gate voltage VG) as described above, the element A and the element B are considered to have the same characteristics. Therefore, by using such element A and element B as the diode-connected first and second MOS temperature transistors in the detection voltage generation circuit 1c2 and reference voltage generation circuit 1d, respectively, and adjusting the current with the current mirror circuit 1b, the characteristics of the diode-connected first and second MOS transistors may be adjusted appropriately, which results in offsetting characteristic deviations efficiently.

FIG. 12 illustrates an example of the characteristics of gate voltage and drain current of the MOS transistors. The horizontal axis represents gate voltage VG, whereas the vertical axis represents drain current ID. Assuming here that the element A and the element B have the same characteristics, the element A and the element B have the same temperature change (temperature dependency) in an operating point under predetermined conditions. Therefore, assuming that the element A is the temperature detection voltage generation circuit 1c2 and the element B is the reference voltage generation circuit 1d, the temperature detection voltage generation circuit 1c2 and the reference voltage generation circuit 1d have the same temperature change in the operating point under predetermined conditions, as the same characteristics.

More specifically, assuming that the element A is the first MOS transistor and the element B is the second MOS transistor, the first and second MOS transistors have the same temperature change in the threshold voltage (gate voltage VG) under the conditions where a predetermine drain current ID flows, as the same characteristics.

Assume now that, in the waveform g11 at 25° C. and the waveform g12 at 175° C. in FIG. 12, the element A and the element B have the same temperature change in the gate voltage VG needed to cause a predetermined drain current ID to flow. In this case, as a first example, both the element A and the element B have the following characteristics: the gate voltage VG needed to cause a drain current ID of 1 μA to flow is 800 mV at 25° C. (800 mV @ 25° C.) and 600 mV at 175° C. (600 mV @ 175° C.).

As a second example, assume that the element B is designed to be able to cause a current twice as large as the current of the element A to flow. In this case, with respect to the element A, the gate voltage VG needed to cause a drain current ID of 1 μA to flow is 800 mV at 25° C. (800 mV @ 25° C.) and 600 mV at 175° C. (600 mV @ 175° C.). With respect to the element B, the gate voltage VG needed to cause a drain current ID of 2 μA to flow is 800 mV at 25° C. (800 mV @ 25° C.) and 600 mV at 175° C. (600 mV @ 175° C.).

In both the above first and second examples, the element A and the element B exhibit the same temperature change. Therefore, in the case of the same temperature change in the threshold voltage (gate voltage VG) under the conditions where a predetermined drain current ID flows, the element A and the element B have the same characteristics. Therefore, by using such element A and element B as the diode-connected first and second MOS transistors in the temperature detection voltage generation circuit 1c2 and reference voltage generation circuit 1d, respectively, it becomes possible to adjust the characteristics of the diode-connected first and second MOS transistors appropriately, which results in offsetting characteristic deviations efficiently.

According to the present embodiment described above, it is possible to offset a deviation occurring in a constant current source provided in a device, a deviation in a threshold voltage of a MOSFET provided in the device, or another, which makes it possible to reduce a characteristic shift and thus to improve the accuracy of temperature detection. In addition, there is no need to provide a correction circuit, a trimming circuit, or another for correcting a characteristic shift, which avoids an increase in the implementation scale of circuits.

Heretofore, the embodiment has been described as an example. The configurations of the components illustrated in the embodiment may be replaced with others having the same functions. In addition, other components or processes may be added thereto. Furthermore, two or more components (features) of the embodiment may be combined together.

According to one aspect, it is achieved to reduce a characteristic shift in a circuit element and thus to improve the accuracy of temperature detection.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor device, comprising:
a constant current source;
a current mirror circuit that copies a current from the constant current source to thereby generate a copied current;
a temperature detection circuit, including:
    a temperature detection diode having an anode and a cathode, and
    a temperature detection voltage generation circuit including a first metal oxide semiconductor (MOS) transistor connected to the cathode of the temperature detection diode, such that the temperature detection voltage generation circuit connects in series with the temperature detection diode,
the temperature detection circuit being configured to output a temperature detection voltage based on the copied current;
a reference voltage generation circuit that generates a reference voltage based on the copied current, the reference voltage generation circuit including a second MOS transistor and having same characteristics as the temperature detection voltage generation circuit; and
a comparison circuit that compares the temperature detection voltage with the reference voltage, to thereby output a temperature detection signal, the comparison circuit being connected to the anode of the temperature detection diode, wherein
the first MOS transistor is diode-connected, and has a gate and a drain thereof connected to each other and to the comparison circuit via the temperature detection diode, the second MOS transistor is diode-connected, and has a gate and a drain thereof connected to each other and to the comparison circuit directly,
the first MOS transistor and the second MOS transistor are formed by two elements that are same in characteristics thereof, and as the same characteristics, the first MOS transistor and the second MOS transistor are identical in a threshold voltage serving as an operating point or in a temperature change of the threshold voltage under a condition in which a predetermined drain current flows to the first MOS transistor and the second MOS transistor,
the first MOS transistor is a first NMOS (N-type MOS) transistor,
the second MOS transistor is a second NMOS transistor,
the cathode of the temperature detection diode is connected to a gate of the first NMOS transistor and a drain of the first NMOS transistor,
a source of the first NMOS transistor is connected to a reference potential,
a source of the second NMOS transistor is connected to the reference potential,
the comparison circuit has an inverting input terminal and a non-inverting input terminal, and
the current mirror circuit has:
    a first terminal connected to the anode of the temperature detection diode and the inverting input terminal of the comparison circuit, and
    a second terminal connected to the non-inverting input terminal of the comparison circuit, a gate of the second NMOS transistor, and a drain of the second NMOS transistor.

2. A semiconductor device, comprising:
a constant current source;
a current mirror circuit that copies a current from the constant current source to thereby generate a copied current;
a temperature detection circuit, including:
    a temperature detection diode having an anode and a cathode, and
    a temperature detection voltage generation circuit including a first metal oxide semiconductor (MOS) transistor connected to the cathode of the temperature detection diode, such that the temperature detection voltage generation circuit connects in series with the temperature detection diode,
the temperature detection circuit being configured to output a temperature detection voltage based on the copied current;
a reference voltage generation circuit that generates a reference voltage based on the copied current, the reference voltage generation circuit including a second MOS transistor and having same characteristics as the temperature detection voltage generation circuit; and
a comparison circuit that compares the temperature detection voltage with the reference voltage, to thereby output a temperature detection signal, the comparison circuit being connected to the anode of the temperature detection diode, wherein
the first MOS transistor is diode-connected, and has a gate and a drain thereof connected to each other and to the comparison circuit via the temperature detection diode,
the second MOS transistor is diode-connected, and has a gate and a drain thereof connected to each other and to the comparison circuit directly,
the first MOS transistor and the second MOS transistor are formed by two elements that are same in characteristics thereof, and as the same characteristics, the first MOS transistor and the second MOS transistor are identical in a threshold voltage serving as an operating point or in a temperature change of the threshold voltage under a condition in which a predetermined drain current flows to the first MOS transistor and the second MOS transistor, the first MOS transistor is a first PMOS (P-type MOS) transistor, the second MOS transistor is a second PMOS transistor, the anode of the temperature detection diode is connected to a gate of the first PMOS transistor and a drain of the first PMOS transistor, a source and a back gate of the first PMOS transistor are connected to a power supply voltage, a source and a back gate of the second PMOS transistor are connected to the power supply voltage, the comparison circuit has an inverting input terminal and a non-inverting input terminal, and the current mirror circuit has:

a first terminal connected to the cathode of the temperature detection diode and the non-inverting input terminal of the comparison circuit, and a second terminal connected to the inverting input terminal of the comparison circuit, a gate of the second PMOS transistor, and a drain of the second PMOS transistor.

* * * * *